Patented July 8, 1941

2,248,472

UNITED STATES PATENT OFFICE 2,248,472

PROCESS FOR REMOVING SILICA FROM ARGILLACEOUS ALUMINO-SILICATES

Eduard Zintl, Darmstadt, Wilhelm Bräuning, Sandersdorf, and Walter Krings, Bitterfeld, Germany, assignors, by mesne assignments, to Walther H. Duisberg, New York, N. Y.

No Drawing. Application May 29, 1939, Serial No. 276,422. In Germany June 8, 1938

8 Claims. (Cl. 23—142)

This invention relates to a process of removing silica from alumino-silicates and especially clays.

Alumina has hitherto usually been produced from alumino-silicates such as clays, by treating said alumino-silicates with acids and separating the insoluble silica from the solutions thus obtained. The solutions are then treated for the recovery of alumina therefrom while at the same time regenerating the acid used for decomposing the originating material. This treatment is however necessarily complicated and costly.

It is known that at the high temperatures prevailing in the electric furnace, mixtures of silica and carbon are volatilised with evolution of silicon-monoxide and carbon-monoxide.

It has now been ascertained that, at high temperatures, carbon is also able to react with alumino-silicates containing silica in the combined form, to form volatilisable silicon-monoxide.

Based on the foregoing observation, the present invention provides a process of removing silica from alumino-silicates, especially clays, which comprises heating a mixture of aluminosilicate with a carbon-containing reducing agent especially carbon, in which mixture the carbon and silica are present in equi-atomic proportions, to a temperature exceeding 1200° C. and preferably at least 1500° C., sufficiently high to produce a reaction between the carbon present and the silicate of the mixture, with the formation of silicon-monoxide.

The foregoing reaction can be accelerated by the employment of a reduced pressure or vacuum.

If the reaction be carried out at atmospheric pressure or under only moderately reduced pressure, an atmosphere of an inert gas such as hydrogen or carbon monoxide must be employed and it is moreover necessary to use somewhat higher temperatures in order to effect a complete reaction of the silica.

The carbon required for carrying out the process preferably consists of powdered graphite or lignite.

Silicon carbide can however be used instead of carbon, in which case the reaction proceeds in accordance with the equation:

$$Al_2O_3 \cdot xSiO_2 + \frac{x}{2}SiC = Al_2O_3 + \frac{3}{2}xSiO + \frac{x}{2}CO.$$

In this case also the minimum reaction temperature is somewhat higher.

In view of the fact that when carrying out the hereindescribed process with commercial starting materials, certain impurities of an oxidic nature (such as $Fe_2O_3$ and $TiO_2$) contained in the clay are co-reduced by the reducing agent, the amount of the latter must in such case, be correspondingly increased over that theoretically required.

Example I 100 parts by weight of a clay dried at 300° C. and ground, and of the composition:

|  | Per cent |
|---|---|
| $SiO_2$ | 46.58 |
| $Al_2O_3$ | 32.33 |
| $Fe_2O_3$ | 2.72 |
| $TiO_2$ | 0.92 |
| $MgO$ | 0.44 |
| $Na_2O$ | 1.10 |

Remainder: loss in drying are mixed with 10.58 parts by weight of fine pulverulent graphite. The mixture is then moulded into small shaped bodies and heated in vacuo (2 mm. mercury absolute) for six hours at a temperature of 1400 to 1500° C. A mixture of silicon monoxide and carbon monoxide is generated from which the silicon monoxide can be recovered by condensation in a receiver. 34.78 parts by weight of a residue composed of

|  | Per cent |
|---|---|
| $Al_2O_3$ | 92.93 |
| Fe | 5.46 |
| Ti | 1.58 |
| $SiO_2$ | 0.02 | are left behind.

Example II 100 parts by weight of a dried, finely ground clay of the same composition as that set forth in Example I are mixed with 29.1 parts by weight of lignite powder of the composition:

|  | Per cent |
|---|---|
| C | 51.7 |
| $H_2O$ | 37.93 |
| Ash content | 10.37 |

| Composition of the ash: | Per cent |
|---|---|
| $Al_2O_3$ | 0.18 |
| $SiO_2$ | 2.91 |
| $TiO_2$ | 1.08 |
| $Fe_2O_3$ | 16.18 |
| MnO | 0.36 |
| CaO | 33.00 |
| MgO | 1.04 |
| $SO_3$ | 43.15 |

The mixture is moulded into shaped bodies which are heated for 15 minutes in a current of hydrogen at a temperature of 1000° C. for the purpose of coking the lignite. The shaped bodies, pre-treated in this manner, are then heated in vacuo (2 mm. mercury absolute) for 6 hours at a temperature of 1400 to 1500° C. 36.15 parts by weight of a residue consisting of:

| | Per cent |
|---|---|
| $Al_2O_3$ | 89.40 |
| Fe | 6.19 |
| CaO | 2.74 |
| Ti | 1.66 |
| $SiO_2$ | 0.019 | are left behind.

We claim:

1. A process of producing alumina from argillaceous alumino-silicates, which comprises heating a mixture of alumino-silicate and a carboniferous material, in which mixture carbon and silicon are present in substantially equi-atomic proportions, to a temperature exceeding about 1200° C. so as to produce a reaction between the carbon and the silicate resulting in a volatilisation of the silicon as silicon monoxide, reducing the partial pressure of silicon monoxide in the reaction space and continuing the reaction until substantially all of the silicon is expelled from the reaction mass.

2. A process of producing alumina from argillaceous alumino-silicates, which comprises heating a mixture of alumino-silicate and a carboniferous material, in which mixture carbon and silicon are present in substantially equi-atomic proportions, to a temperature amounting to about 1500° C. so as to product a reaction between the carbon and the silicate resulting in a volatilisation of the silicon as silicon monoxide reducing the partial pressure of silicon monoxide in the reaction space and continuing the reaction until substantially all of the silicon is expelled from the reaction mass.

3. A process of producing alumina from argillaceous alumino-silicates, which comprises heating a mixture of alumino-silicate and native carbon material, in which mixture carbon and silicon are present in substantially equi-atomic proportions, to a temperature exceeding about 1200° C. so as to produce a reaction between the carbon and the silicate resulting in a volatilisation of the silicon as silicon monoxide, reducing the partial pressure of silicon monoxide in the reaction space and continuing the reaction until substantially all of the silicon is expelled from the reaction mass.

4. A process of producing alumina from argillaceous alumino-silicates, which comprises heating a mixture of alumino-silicate and silicon carbide, in which mixture carbon and silicon are present in substantially equi-atomic proportions, to a temperature exceeding about 1200° C. so as to produce a reaction between the carbon and the silicate resulting in a volatilisation of the silicon as silicon monoxide, reducing the partial pressure of silicon monoxide in the reaction space and continuing the reaction until substantially all of the silicon is expelled from the reaction mass.

5. A process of producing alumina from argillaceous alumino-silicates, which comprises heating a mixture of alumino-silicate and a carboniferous material, in which mixture carbon and silicon are present in substantially equi-atomic proportions, to a temperature exceeding about 1200° C. under reduced pressure in an atmosphere of an inert gas so as to produce a reaction between the carbon and the silicate resulting in a volatilisation of the silicon as silicon monoxide and continuing the reaction until substantially all of the silicon is expelled from the reaction mass.

6. A process of producing alumina from argillaceous alumino-silicates, which comprises heating a mixture of alumino-silicate and a carboniferous material, in which mixture carbon and silicon are present in substantially equi-atomic proportions, to a temperature exceeding about 1200° C. in a substantially complete vacuum so as to produce a reaction between the carbon and the silicate resulting in a volatilisation of the silicon as silicon monoxide and continuing the reaction until substantially all of the silicon is expelled from the reaction mass.

7. A process of producing alumina from argillaceous alumino-silicates, which comprises heating a mixture of alumino-silicate and a carboniferous material, in which mixture carbon and silicon are present in substantially equi-atomic proportions, to a temperature exceeding about 1200° C. so as to produce a reaction between the carbon and the silicate resulting in a volatilisation of the silicon as silicon monoxide, an additional amount of carboniferous material being incorporated in the reaction mixture, which additional amount is sufficient to reduce any impurities of an oxidic nature contained in the alumino-silicate and which become reduced under the conditions of operation reducing the partial pressure of silicon monoxide in the reaction space and continuing the reaction until substantially all of the silicon is expelled from the reaction mass.

8. A process of producing alumina from argillaceous alumino-silicates, which comprises heating a mixture of alumino-silicate and a carboniferous material, in which mixture carbon and silicon are present in substantially equi-atomic proportions, to a temperature exceeding about 1200° C. under reduced pressure in an atmosphere of an inert gas so as to produce a reaction between the carbon and the silicate resulting in a volatilisation of the silicon as silicon monoxide, an additional amount of carboniferous material being incorporated in the reaction mixture, which additional amount is sufficient to reduce any impurities of an oxidic nature contained in the alumino-silicate and which become reduced under the conditions of operation and continuing the reaction until substantially all of the silicon is expelled from the reaction mass.

EDUARD ZINTL.
WILHELM BRÄUNING.
WALTER KRINGS.